(12) United States Patent
Tallman, Jr.

(10) Patent No.: US 8,171,249 B2
(45) Date of Patent: *May 1, 2012

(54) INTERNET-SAFE COMPUTER

(76) Inventor: Leon C. Tallman, Jr., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/031,719

(22) Filed: Feb. 22, 2011

(65) Prior Publication Data

US 2011/0173384 A1 Jul. 14, 2011

Related U.S. Application Data

(63) Continuation of application No. 11/341,039, filed on Jan. 28, 2006, now Pat. No. 7,917,715.

(51) Int. Cl.
*G06F 12/00* (2006.01)
(52) U.S. Cl. .................. 711/165; 711/163; 714/6.32
(58) Field of Classification Search .................. 711/163
See application file for complete search history.

(56) References Cited

U.S. PATENT DOCUMENTS

| | | | |
|---|---|---|---|
| 6,049,854 A * | 4/2000 | Bedarida | 711/153 |
| 6,182,240 B1 * | 1/2001 | Mine | 714/5.11 |
| 7,100,075 B2 * | 8/2006 | Largman et al. | 714/13 |
| 7,146,640 B2 * | 12/2006 | Goodman et al. | 726/16 |

\* cited by examiner

*Primary Examiner* — Matthew Bradley
*Assistant Examiner* — Kalpit Parikh
(74) *Attorney, Agent, or Firm* — Valauskas Corder LLC

(57) ABSTRACT

The present invention eliminates the possibility of problems with viruses, worms, identity theft, and other hazards that may result from the connection of a computer to the Internet. It does so by creating a new configuration of components within the computer. In addition to commonly used components, two new components are added. These are a secondary hard drive and a secondary random access memory. When the computer is connected to the Internet these secondary components are used in place of their primary counterparts. The primary hard drive is electronically isolated from the Internet, thus preventing Internet contamination of the primary hard drive.

11 Claims, 1 Drawing Sheet

Schematic of Present Invention

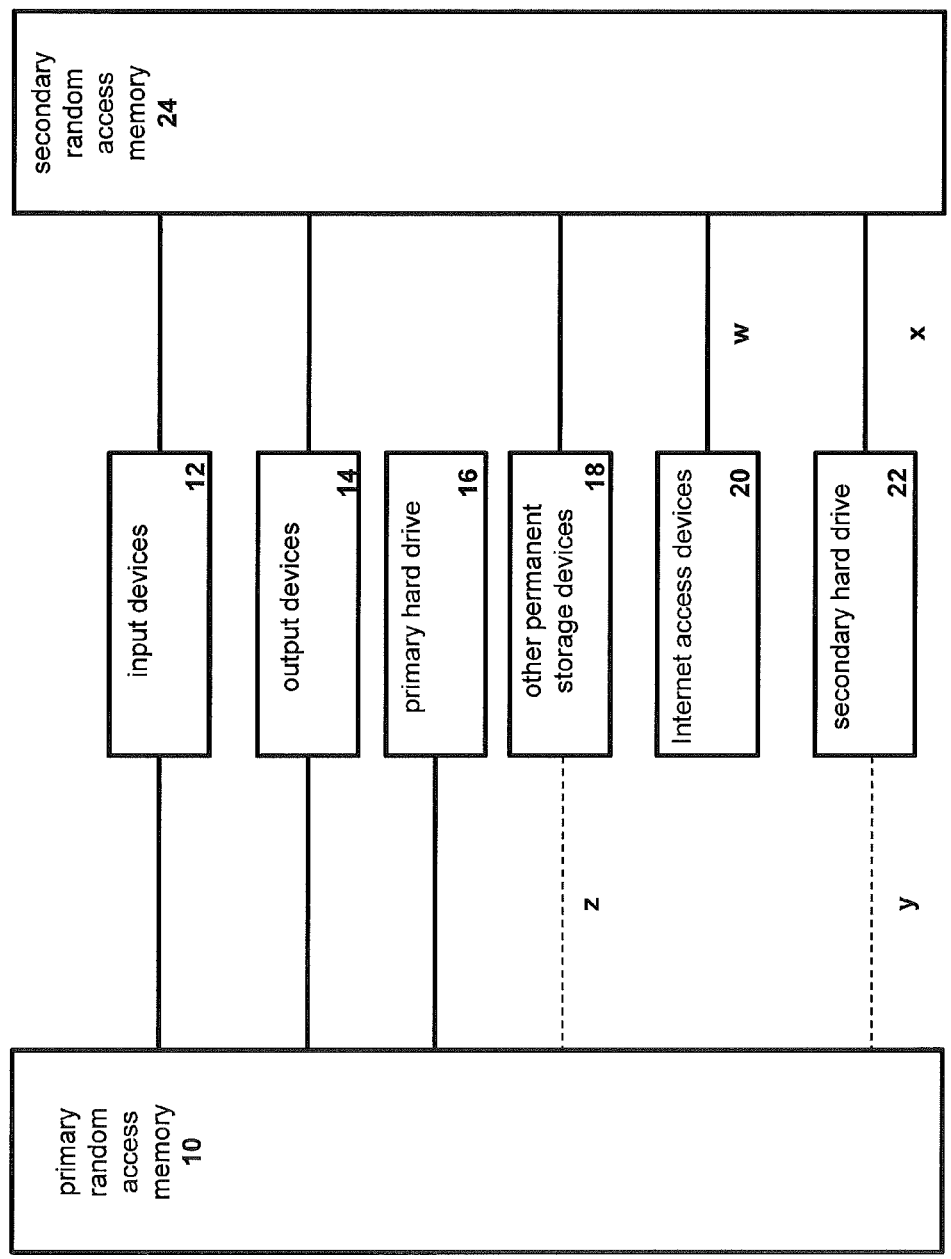

INTERNET-SAFE COMPUTER

This is a continuation of U.S patent application Ser. No. 11/341,039 filed on Jan. 28, 2006 now U.S. Pat. No. 7,917,715 by Leon C. Tallman, entitled "Internet-Safe Computer."

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF INVENTION

This invention identifies an arrangement of the major components within a computer that will prevent hard drive contamination from the Internet.

BACKGROUND OF THE INVENTION

As used herein the term "personal computer" will be understood to include computers using either the Windows operating system or the Macintosh operating system. Internet applications have become an increasingly popular use for personal computers. Along with benefits provided by the Internet, there are also possible dangers:

(a) Viruses and worms may invade the computer hard drive. This can result in the loss of valuable information that was contained on the hard drive. Repairs to the hard drive may be expensive and time-consuming.

(b) Unscrupulous persons may gain access to personal information that is kept on the hard drive. This can permit identity theft whereby the thief assumes the identity of the victim. Significant financial losses for the victim often result.

The dangers presented by computer connection to the Internet have thus far been addressed through the use of protective software. Improvements in protective software are being met with further sophistication in the methods used by identity thieves and creators of viruses and worms. Protective software may never be a permanent solution. In addition, it is becoming more expensive. The cost of protective software is becoming a significant and increasing part of the total cost of owning a personal computer.

OBJECTS AND ADVANTAGES

The objects and advantages of the present invention are:

(a) To prevent the harmful transmission of information from the Internet to the computer hard drive.

(b) To prevent the harmful extraction of information from the computer hard drive to the Internet.

(c) To provide a configuration of the components in a personal computer that will inherently and permanently provide these advantages.

SUMMARY

In accordance with the present invention, a configuration of major computer components isolates the computer hard drive from the Internet during the entire period that the computer is connected to the Internet.

DETAILED DESCRIPTION—PREFERRED EMBODIMENT

A preferred embodiment of the present invention is shown on FIG. 1A. Many of the components shown are used in conventional personal computers sold today. These include:

10 random access memory
12 input devices (such as keyboards and mice)
14 output devices (such as display screens)
16 primary hard drive
18 other permanent storage devices (such as CD drives, DVD drives, and others)
20 Internet access devices (modems) or connectors The basic input/output system and the computer operating system manage the interface between the random access memory and the other devices. Since an electronic connection exists between the Internet and the hard drive, the hard drive contamination described above can occur.

The present invention provides the following component changes for use with Internet applications:

(a) Secondary random access memory 24 replaces primary random access memory 10.

(b) Internet access devices 20 are electronically connected to secondary random access memory 24 through connection w. Internet access devices 20 are not electronically connected to primary random access memory 10.

(c) Secondary hard drive 22 replaces primary hard drive 16.

(d) Secondary hard drive 22 is electronically connected to secondary random access memory 24 through connection x. Connection y between secondary hard drive 22 and primary random access memory 10 does not exist while the Internet is in use.

(e) Primary hard drive 16 is connected to primary random access memory 10. It is not connected to secondary random access memory 24.

(f) Input devices 12, output devices 14, and other permanent storage devices 18 are connected to both primary random access memory 10 and secondary random access memory 24.

Operation—Preferred Embodiment

Preparation of secondary hard drive 22 includes copying the basic input/output system and the computer operating system to the secondary hard drive storage medium. Preparation also requires copying Internet-related applications software to the secondary hard drive storage medium. Copying to secondary hard drive 22 will not be permitted if any Internet connection is active. The copying requires a temporary connection y between secondary hard drive 22 and primary random access memory 10. Connection y will be severed once the preparation of secondary hard drive 22 is complete. The secondary hard drive storage medium will remain in use unless and until it is corrupted by Internet applications. The corrupted storage medium will then be destroyed and another will be prepared.

When Internet applications are in use, secondary random access memory 24 and secondary hard drive 22 will be active. When Internet applications are not in use, primary random access memory 10 and primary hard drive 16 will be active. The basic input/output system and computer operating system will be modified to accomplish the switching.

The present invention does not limit the availability of downloads from the Internet. Unintentional downloads in the form of viruses, worms, and security breaches are confined to secondary random access memory 24 and secondary hard drive 22. Powering down of the computer will clear random access memory 24. A corrupted storage medium in secondary hard drive 22 can be destroyed. It can then be replaced with a new storage medium, prepared as explained above. Intentional downloads can be copied to one of the other permanent storage devices 18. From there they can be accessed by primary random access memory 10 and copied to primary hard drive 16. Connection z between other permanent storage devices 18 and primary access memory 10 is severed while Internet applications are in use but is available when Internet connections are terminated.

Conclusions, Ramifications, and Scope of Invention

As long as an electronic connection exists between the Internet and the principal hard drive of a computer, the potential exists for corruption of the hard drive. This invention eliminates that electronic connection and ensures the safety of the hard drive.

The selection of the device to be used as the secondary hard drive will be governed by the need for sufficient capacity to accommodate the operating system and selected applications. Also, the storage medium used by the secondary hard drive must be easy and inexpensive to remove and replace. At the present time a DVD drive appears to be the best choice. As storage technology continues to improve, other devices may offer advantages.

The present invention describes two parallel environments, one for Internet applications and one for non-Internet applications. Safety for the principal hard drive results from the existence of the two parallel environments. The method of switching between Internet and non-Internet applications provides opportunity for additional development but such improvements would still depend on the present invention.

An alternative to copying the basic input/output system, the computer operating system and Internet application software to the secondary hard drive would be to copy them to the secondary random access memory. Reductions in the cost of random access memory may eventually favor this approach. However by this approach the essential parallel environment concept of the present invention is maintained.

What is claimed is:

1. A computer, comprising:
  a primary random access memory;
  a secondary random access memory physically separated from the primary random access memory;
  a primary hard drive in electrical communication with the primary random access memory and never in electrical communication with the secondary random access memory, the primary hard drive having an operating system;
  an Internet access device for connecting to the Internet, the Internet access device in electrical communication with the secondary random access memory and never in electrical communication with the primary random access memory;
  a secondary hard drive physically separate from the primary hard drive in electrical communication with the secondary random access memory and having an operating system; and
  wherein the secondary hard drive is configured to be in temporary electrical communication with the primary random access memory only when the Internet access device is not connected to the Internet.

2. The computer of claim 1, wherein the temporary electrical communication only occurs when software is copied from the primary hard drive to the secondary hard drive.

3. The computer of claim 2, wherein the primary hard drive includes Internet-related application software and the computer is configured to copy the Internet-related application software to the secondary hard drive when the secondary hard drive is in the temporary electrical communication with the primary random access memory.

4. The computer of claim 3, wherein the secondary random access memory and secondary hard drive are configured to be active when Internet applications are in use and the primary random access memory and the primary hard drive are configured to be active only when no Internet connection exists.

5. The computer of claim 4, wherein the secondary hard drive is a DVD drive utilizing a DVD as a storage medium.

6. A computer, comprising:
  a primary random access memory;
  a secondary random access memory physically separated from the primary random access memory;
  a primary hard drive in electrical communication with the primary random access memory and never in electrical communication with the secondary random access memory, the primary hard drive having an operating system;
  an Internet access device for connecting to the Internet, the Internet access device in electrical communication with the secondary random access memory and never in electrical communication with the primary random access memory;
  wherein the secondary random access memory is configured to be in temporary electrical communication with the primary random access memory only when the Internet access device is not connected to the Internet; and
  wherein data on the secondary random access memory is removed when the computer is powered down.

7. The computer of claim 6, wherein an operating system is loaded into the secondary random access memory.

8. The computer of claim 6, wherein the temporary electrical communication only occurs when software is copied from the primary random access memory to the secondary random access memory.

9. The computer of claim 8, wherein the primary hard drive includes Internet-related application software and the computer is configured to copy the Internet-related application software to the secondary random access memory when the secondary random access memory is in the temporary electrical communication with the primary random access memory.

10. The computer of claim 9, wherein the secondary random access memory is configured to be active when Internet applications are in use and the primary random access memory and the primary hard drive are configured to be active only when no Internet connection exists.

11. A computer, comprising:
  a primary random access memory;
  a secondary random access memory physically separated from the primary random access memory;
  no more than one primary hard drive,
  wherein the one primary hard drive may be in electrical communication with the primary random access memory and is never in electrical communication with the secondary random access memory, the one primary hard drive having an operating system;

an Internet access device for connecting to the Internet, the Internet access device in electrical communication with the secondary random access memory and never in electrical communication with the primary random access memory;

wherein the secondary random access memory replaces the primary random access memory when the computer is connected to the Internet;

wherein the secondary random access memory is configured to be in temporary electrical communication with the primary random access memory only when the Internet access device is not connected to the Internet; and wherein any data on the secondary random access memory is removed when the computer is powered down.

* * * * *